United States Patent
Dove et al.

(10) Patent No.: US 7,154,884 B2
(45) Date of Patent: *Dec. 26, 2006

(54) STACKPLANE ARCHITECTURE

(75) Inventors: Jason Dove, Novato, CA (US); Paul Franceschini, Petaluma, CA (US)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/311,042

(22) Filed: Dec. 19, 2005

(65) Prior Publication Data

US 2006/0120360 A1 Jun. 8, 2006

Related U.S. Application Data

(63) Continuation of application No. 09/469,897, filed on Dec. 22, 1999, now Pat. No. 7,050,428.

(51) Int. Cl.
*H04L 12/66* (2006.01)

(52) U.S. Cl. ............... 370/376; 370/462; 370/539

(58) Field of Classification Search ............... None
See application file for complete search history.

(56) References Cited

U.S. PATENT DOCUMENTS

| | | | | |
|---|---|---|---|---|
| 4,878,048 A | * | 10/1989 | Gottesman et al. | 340/825.01 |
| 5,526,344 A | * | 6/1996 | Diaz et al. | 370/364 |
| 5,784,371 A | * | 7/1998 | Iwai | 370/397 |
| 5,878,042 A | * | 3/1999 | Fraas et al. | 370/395.6 |
| 5,889,773 A | * | 3/1999 | Stevenson, III | 370/352 |
| 5,901,024 A | * | 5/1999 | Deschaine et al. | 361/67 |
| 5,926,479 A | * | 7/1999 | Baran | 370/395.61 |
| 6,415,325 B1 | * | 7/2002 | Morrien | 709/230 |
| 6,480,487 B1 | * | 11/2002 | Wegleitner et al. | 370/354 |
| 6,480,511 B1 | * | 11/2002 | Petty | 370/509 |
| 7,050,428 B1 | * | 5/2006 | Dove et al. | 370/376 |

* cited by examiner

*Primary Examiner*—Doris H. To
*Assistant Examiner*—Phuongchau Ba Nguyen
(74) *Attorney, Agent, or Firm*—Bobby D. Slaton; V. Lawrence Sewell

(57) ABSTRACT

A scalable multi-service node system uses a stackplane architecture which allows the transport capacity to be flexibly expanded while providing first traffic mode and second traffic mode link channels. The primary channel bank is provided, and one or more secondary channel banks are connected to the primary channel bank through the stackplane first traffic mode and second traffic mode links. The system is expandable by adding secondary channel banks to the system through the stackplane links.

7 Claims, 6 Drawing Sheets

STACKPLANE ARCHITECTURE

PRIORITY UNDER 35 U.S.C. §119(e) & §120 AND 37 C.F.R. §1.78

This application is a continuation of U.S. non-provisional patent application entitled "Stackplane Architecture," Ser. No. 09/469,897, filed Dec. 22, 1999 now U.S. Pat. No. 7,050,428, in the names of Jason Dove and Paul Franceschini, which is incorporated by reference in its entirety for all purposes.

BACKGROUND OF THE INVENTION

1. Field of the Invention

The present invention relates to telecommunications, and more particularly, to a telecommunications switching network.

2. Background

The telecommunications industry has developed telecommunications switching systems including channel banks with cross-connections to establish communication links. A plurality of channel banks are typically provided on a standard equipment rack to serve as a node in a telecommunications switching network. A plurality of such nodes may be formed with point-to-point, ring or branch interconnections, or a combination thereof, to form a telecommunications switching network. However, conventional channel banks within each node are connected through interfaces with limited bandwidths. Furthermore, the scalability of conventional channel banks in a telecommunications node is limited.

Therefore, there is a need for a scalable and modular digital loop carrier system with integrated transport, switching and control functions which can be flexibly expanded to increase its transport capacity. Furthermore, there is a need for interfaces between the channel banks with increased bandwidths which allow simultaneous transfer of different native mode traffic types, including time division multiplex (TDM) and asynchronous transfer mode (ATM) traffic.

SUMMARY OF THE INVENTION

In accordance with the present invention, a scalable digital loop carrier system roughly comprises:

(a) a primary channel bank;

(b) an asynchronous transfer mode (ATM) interface connected to the primary channel bank;

(c) a time division multiplex (TDM) interface connected to the primary channel bank; and (d) at least a first secondary channel bank connected to the primary channel bank through the ATM and TDM interfaces, the primary channel bank capable of providing clock synchronization to the secondary channel bank, wherein the primary channel bank and the secondary channel bank each comprise:

(i) a time slot cross-connect interchanger (TSI) having a plurality of subscriber bus interfaces; and (ii) an ATM access controller connected to the TSI, the ATM access controller having a plurality of ATM cell bus interfaces.

In an embodiment, the primary channel bank further comprises a synchronous transport signal (STS) cross-connect controller connected to the TSI and the ATM access controller in the primary channel bank. In a further embodiment, the primary channel bank further comprises a synchronous optical network (SONET) framer connected to the STS cross-connect controller in the primary channel bank. In an embodiment, the system further comprises a plurality of STS transport cards connected to the STS cross-connect controller in the primary channel bank.

In an embodiment, the secondary channel bank also comprises an STS cross-connect controller connected to the TSI and the ATM access controller in the secondary channel bank. In a further embodiment, the secondary channel bank further comprises a SONET framer connected to the STS cross-connect controller in the secondary channel bank. In an embodiment, the system further comprises a plurality of STS transport cards connected to the STS cross-connect controller in the secondary channel bank.

In an embodiment, the TDM interface is capable of providing a plurality of STS-1 channels in a SONET frame. In an embodiment, the primary channel bank further comprises a timing generator to provide timing reference to the TSI and the ATM access controller in the primary channel bank. In an embodiment, the timing generator has a timing reference input and a clock synchronization output connected to the secondary channel bank. In a further embodiment, the secondary channel bank further comprises a timing generator to provide timing reference to the TSI and the ATM access controller in the secondary channel bank. In a further embodiment, the timing generator in the secondary channel bank is synchronized by a clock synchronization signal received from the clock synchronization output of the primary channel bank.

In an embodiment, a plurality of secondary channel banks are connected to the primary channel bank in a daisy-chain configuration. Each of the primary and secondary channel banks may be connected directly to two secondary channel banks. The primary channel bank may be connected to two secondary channel banks, and additional secondary channel banks may be connected to the primary channel bank through intermediary secondary channel banks. The TDM and ATM interfaces provide TDM and ATM data link channels for transferring narrowband and broadband data between the channel banks in the scalable digital loop carrier system.

Advantageously, the digital loop carrier system according to the present invention allows flexible expansion of the channel banks to increase the transport capacity of the digital loop carrier system in a modular configuration. Furthermore, the TDM and ATM interfaces between the channel banks are capable of providing an increased total bandwidth which allows simultaneous transfer of different native mode traffic types including TDM, STS, and ATM traffic.

BRIEF DESCRIPTION OF THE DRAWINGS

The present invention will be described with respect to particular embodiments thereof, and references will be made to the drawings in which.

DETAILED DESCRIPTION

Figure 1:
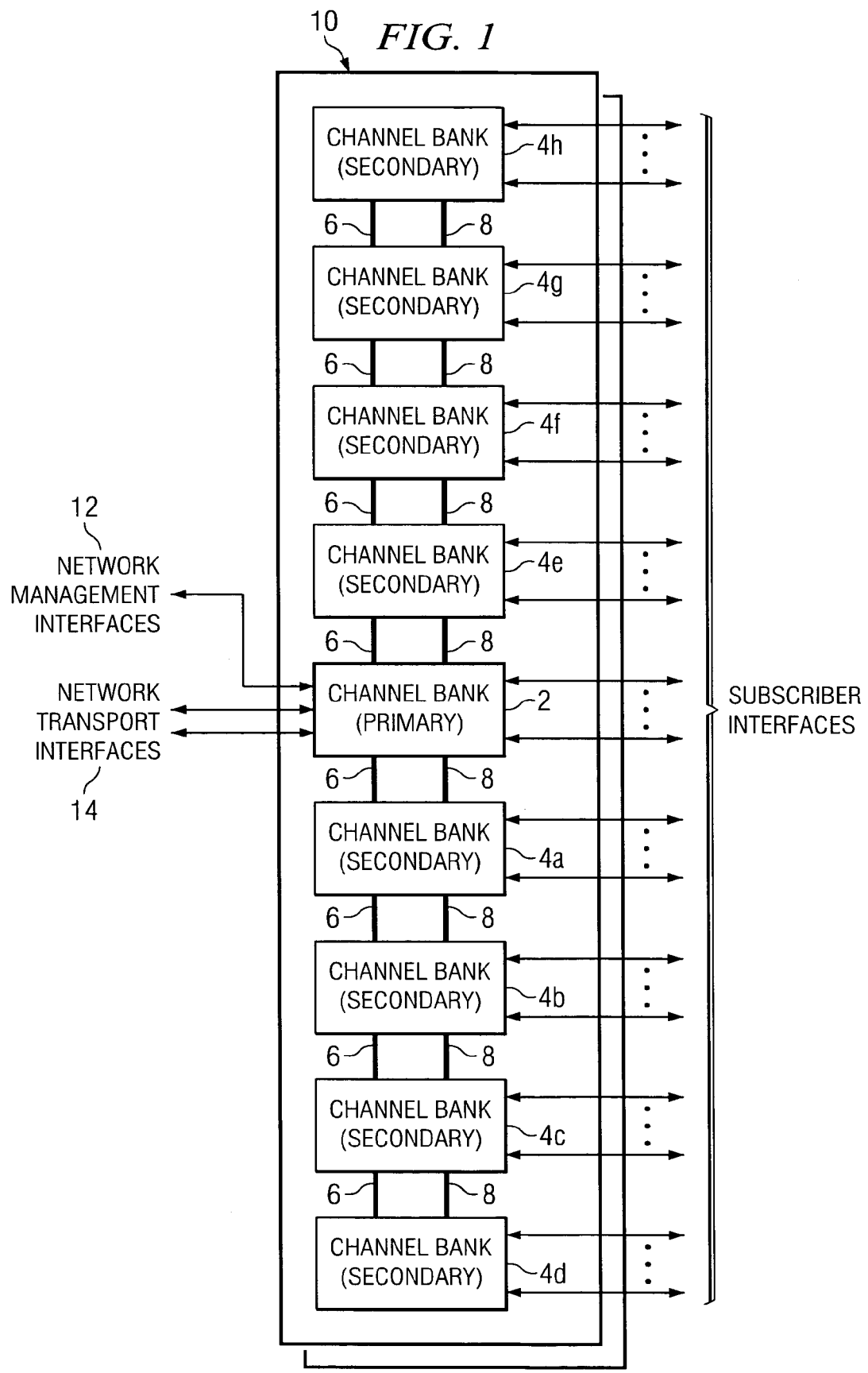
FIG. 1 shows a block diagram of an embodiment of a scalable digital loop carrier system according to the present invention.

FIG. 1 shows a block diagram of a scalable digital loop carrier system in a communications network node in an embodiment according to the present invention. A plurality of such communications network nodes may be provided in a data network with point-to-point, linear chain, ring or branch interconnections, or a combination thereof, between the nodes. The scalable digital loop carrier system as shown in FIG. 1 may also be implemented on a single common equipment rack 10 and used as a stand-alone communications switching network.

As shown in FIG. 1, the scalable digital loop carrier system comprises a primary channel bank 2 and a plurality of secondary channel banks 4a, 4b, 4c, . . . 4h. In an embodiment, the primary and secondary channel banks in the digital loop carrier system are installed on different levels of a common equipment rack, with physical stackplanes between adjacent channel banks on the common equipment rack 10. Asynchronous transfer mode (ATM) and time division multiplex (TDM) interfaces are installed on the stackplane as a physical layer transceiver which provides ATM and TDM data link channels between the channel banks. In the embodiment shown in FIG. 1, an ATM stackplane interface 6 and a TDM stackplane interface 8 are shown as separate interfaces on the stackplane. In an embodiment, each physical stackplane between two adjacent channel banks on the common equipment rack 10 provides both ATM and TDM interfaces for ATM and TDM channel interconnections between the adjacent channel banks.

In an embodiment, the primary channel bank 2 in the scalable digital loop carrier system according to the present invention is connected to one or more network management interfaces 12 and one or more network transport interfaces 14 which control node-to-node traffic flow in a data communications network formed by a plurality of such nodes. The primary channel bank 2 and each of the secondary channel banks 4a, 4b, 4c, . . . 4h provide a plurality of subscriber interfaces which are capable of communicating with a plurality of transport cards, including plain old telephone service (POTS) subscriber service cards.

In the embodiment shown in FIG. 1, the primary channel bank 2 and the secondary channel banks 4a, 4b, 4c, . . . 4h are connected through the stackplane interfaces in a linear chain configuration. Each of the channel banks is connected to adjacent upper and lower channel banks through stackplanes between the channel banks, except for the secondary channel bank 4h at the top and the secondary channel bank 4d at the bottom of the common equipment rack 10.

The scalable digital loop carrier system according to the present invention is expandable if necessary to accommodate higher capacity TDM or ATM traffic or to increase the number of subscriber interfaces provided by each communications node. In an embodiment in which the physical size of the common equipment rack 10 is not a limitation, additional secondary channel banks may be connected to the secondary channel banks 4d and 4h as shown in FIG. 1 through additional ATM and TDM stackplane interfaces if necessary to increase the transport capacity of the digital loop carrier system.

Figure 2:
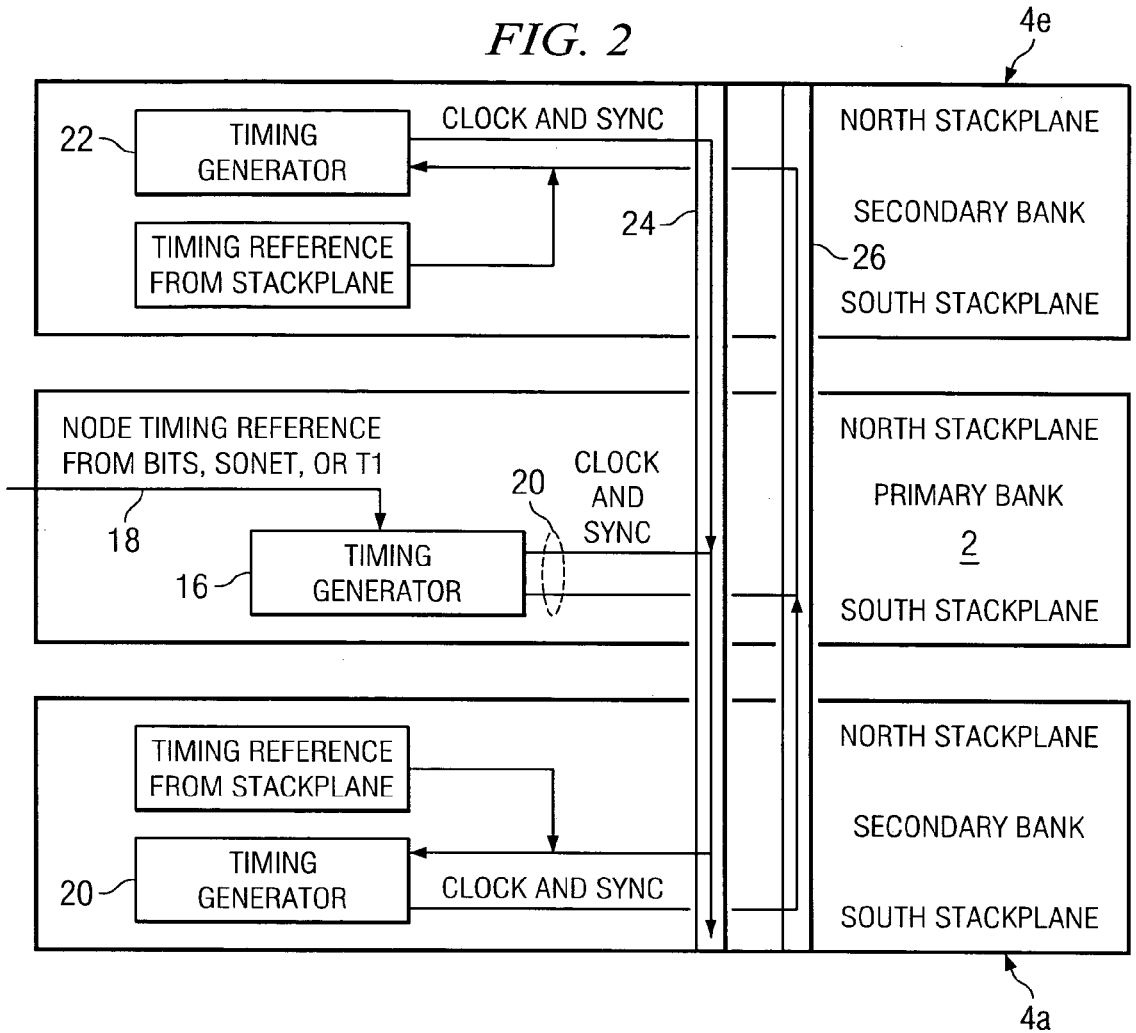
FIG. 2 shows a block diagram of an embodiment of timing and synchronization for the primary and secondary channel banks in the scalable digital loop carrier system according to the present invention.

FIG. 2 shows a block diagram illustrating the provision of timing references for a digital loop carrier system in an embodiment according to the present invention. In an embodiment, the primary channel bank 2 provides timing and synchronization to all of the secondary channel banks, including secondary channel banks 4a and 4e. In FIG. 2, a stackplane immediately above a given one of the channel banks is denoted as a "north" stackplane, whereas the stackplane immediately below the given channel bank is denoted as a "south" stackplane for the purpose of simplifying the description.

In an embodiment, the primary channel bank 2 comprises a timing generator 16 to provide a timing reference for the ATM and TDM interface functions as well as cross-connect functions within the primary channel bank 2. In a further embodiment, the timing generator 16 in the primary channel bank 2 has a node timing reference input 18 and a clock synchronization output 20, which is connected to all of the secondary channel banks including the secondary channel banks 4a and 4e in the scalable digital loop carrier system. The primary channel bank 2 provides a clock synchronization signal through the clock synchronization output 20 for synchronizing the clocks in the secondary channel banks.

In an embodiment, the timing reference input 18 for the timing generator 16 in the primary channel bank 2 comprises a synchronous optical network (SONET) timing reference input provided over the SONET. In another embodiment, the node timing reference input 18 for the timing generator 16 in the primary channel bank 2 comprises a T1 timing reference input if the scalable digital loop carrier system according to the present invention is used for transporting T1 communications payload. In yet another embodiment, the node timing reference input 18 for the timing generator 16 in the primary channel bank 2 comprises a building integrated timing supply (BITS) input which is provided by an office BITS clock in a typical telephone switching system.

In an embodiment, the secondary channel banks each comprise a timing generator to provide a timing reference for the TDM and ATM functions as well as cross-connect functions within the respective secondary channel bank. For example, the secondary channel bank 4a immediately below the primary channel bank 2 includes a timing generator 20 while the secondary channel bank 4e immediately above the primary channel bank 2 includes another timing generator 22. In an embodiment, the timing generator in each of the secondary channel banks is synchronized by the clock synchronization signal which is received from the clock synchronization output 20 of the timing generator 16 of the primary channel bank 2.

In an embodiment, the timing reference for the timing generators 20 and 22 in the secondary channel banks 4a and 4e are provided from the stackplanes which are connected to the primary channel bank 2, whereas the timing reference for the timing generator 16 in the primary channel bank 2 is provided from an external source, such as a bits, SONET, or T1 clock. For the purpose of simplified illustration, signal paths for the clock synchronization signals transferred between the primary and secondary channel banks in southbound and northbound directions are shown as separate clock channels 24 and 26, respectively, between the channel banks in FIG. 2. In an embodiment, the timing generators 20 and 22 in the secondary channel banks 4a and 4e provide timing feedbacks along respective return paths to the controlling timing generator 16 in the primary channel bank 2. Feedback loops between the timing generators in the primary and secondary channel banks allow timing and synchronization to be stabilized for each of the timing generators in the primary and secondary channel banks.

Figure 3:
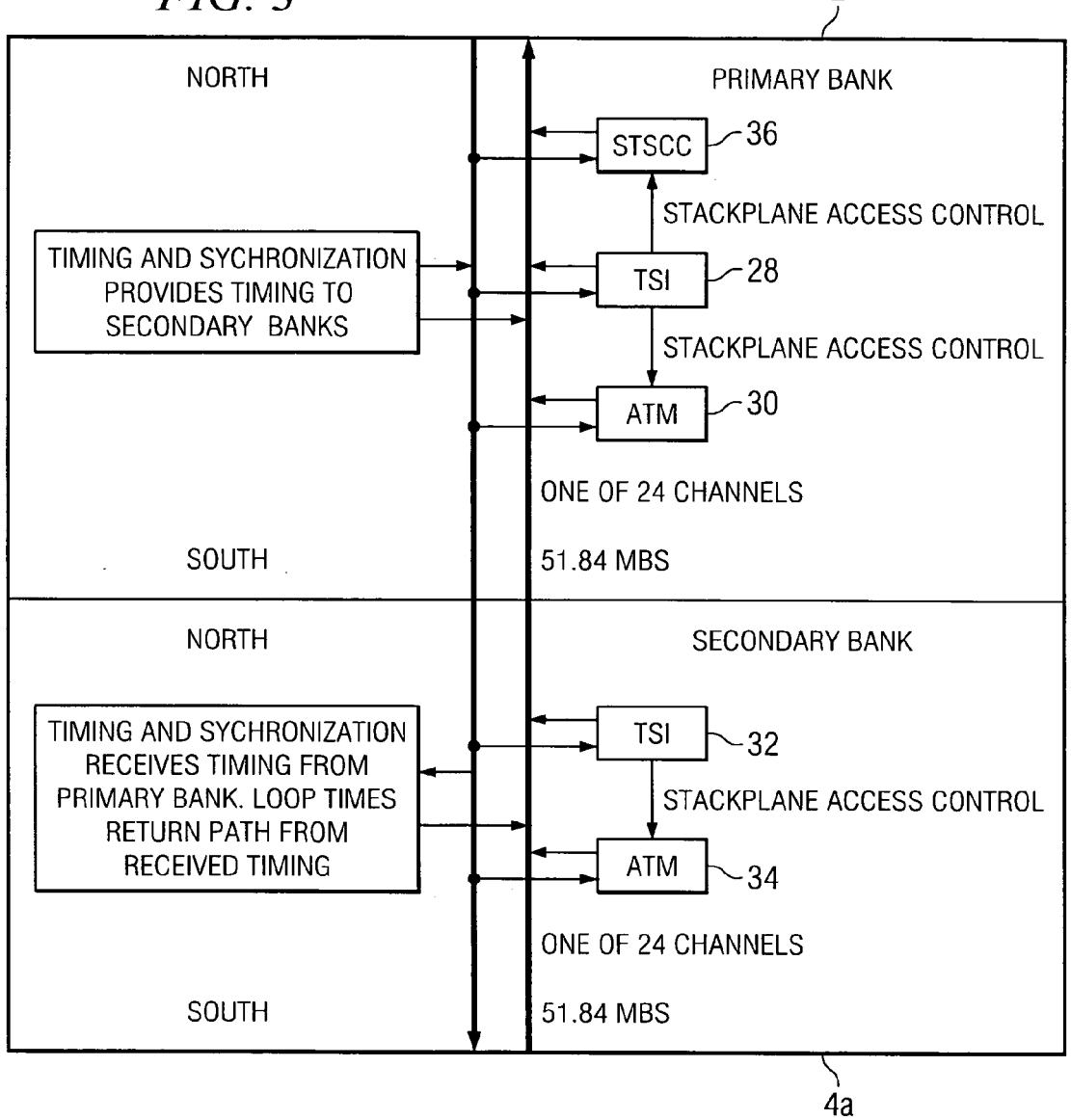
FIG. 3 shows a block diagram of an embodiment of the primary and secondary channel banks in the scalable digital loop carrier system according to the present invention with time slot cross-connect interchangers (TSI) and asynchronous transfer mode (ATM) access controllers.

FIG. 3 shows a block diagram of an embodiment of a scalable digital loop carrier system according to the present invention in which each of the channel banks comprises a time slot cross-connect interchanger (TSI) and an ATM access controller. In FIG. 3, the primary channel bank 2 comprises a TSI 28 and an ATM access controller 30 while the secondary channel bank 4a comprises another TSI 32 and another ATM access controller 34. In an embodiment, other secondary channel banks in the scalable digital loop carrier system according to the present invention have configurations similar to that of the secondary channel bank 4a as shown in FIG. 3.

In an embodiment, each TSI is capable of performing the function of cross-connecting any of the individual time slots on a subscriber bus interface to another time slot on another subscriber bus interface within the channel bank. In a further embodiment, each TSI also performs subscriber bus data link (SBDL) and signaling functions for the subscriber bus interfaces. In an embodiment, the TSI in each of the primary and secondary channel banks is capable of cross-connecting the time slots of a plurality of subscriber bus interfaces, such as variable rate subscriber bus interfaces as described in U.S. Pat. No. 6,621,830 issued Sep. 16, 2003, titled "Variable Rate Subscriber Bus", incorporated herein by reference.

Referring to FIG. 3, the primary channel bank 2 further comprises a synchronous transport signal (STS) cross-connect controller 36 which is connected to the TSI 28 in the primary channel bank 2. The STS cross-connect controller 36 uses an STS channel format to pass STS traffic between the channel banks. In an embodiment, the STS cross-connect controller has 12 STS-1 buses which provide up to 12 STS-1 channels for each transport card slot connected to the STS cross-connect controller 36. In an embodiment, the STS-1 payload transported by the STS cross-connect controller 36 may be any virtual tributary (VT) grouping that complies with GR-253 standard.

The STS-1 payload transferred from the STS cross-connect controller 36 passes through the stackplane transparently between the primary and secondary channel banks. In an embodiment, the ATM access controller in each of the primary and secondary channel banks is connected to the TSI within the respective channel bank for time slot cross-connections. In an embodiment, each of the ATM access controllers 30 and 34 comprises an ATM switch fabric.

Figure 4:
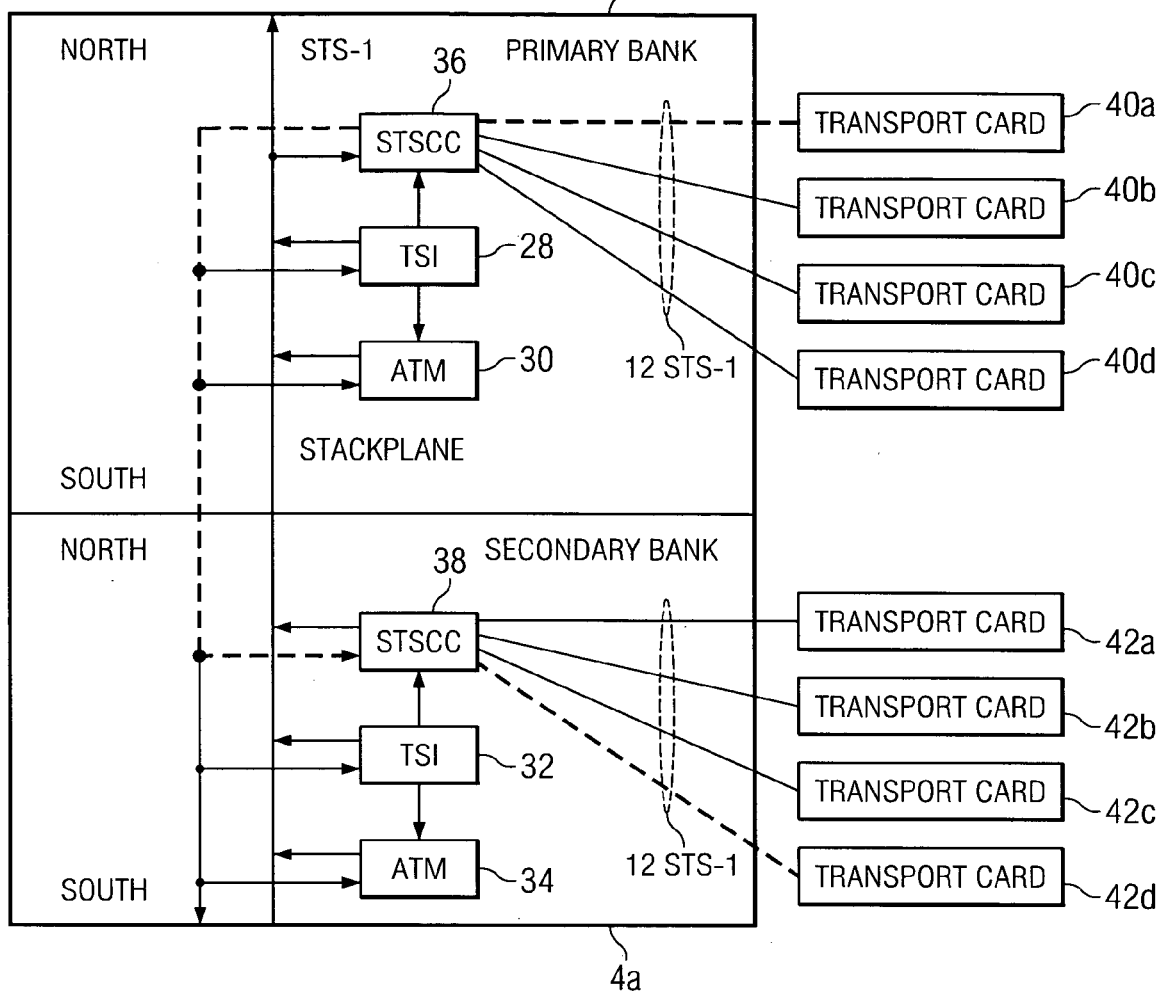
FIG. 4 shows a block diagram of an embodiment of the primary and secondary channel banks in the scalable digital loop carrier system according to the present invention with TSI and ATM access controllers and synchronous transport signal (STS) cross-connect controllers connected to a plurality of STS transport cards.

FIG. 4 shows a block diagram of an embodiment in which each of the primary and secondary channel banks further comprises an STS cross-connect controller for transporting STS-1 payloads between STS transport card slots and passing the STS-1 payloads through the stackplane transparently between different channel banks. As shown in FIG. 4, the secondary channel bank 4a further comprises an STS cross-connect controller 38 to provide a plurality of transport card slots for additional STS transport cards. In an embodiment, the STS cross-connect controllers 36 and 38 in the primary and secondary channel banks 2 and 4a each provide four STS transport card slots, each of which is capable of transporting up to 12 STS-1 signals. In FIG. 4, four STS transport cards 40a, 40b, 40c and 40d are connected to the STS cross-connect controller 36 in the primary channel bank 2, while four additional STS transport cards 42a, 42b, 42c and 42d are connected to the STS cross-connect controller 38 in the secondary channel bank 4a.

In an embodiment, each of the STS transport cards is capable of supporting up to 12 STS-1 channels. Each of the STS cross-connect controllers 36 and 38 thus has a transport capacity of up to 48 STS-1 channels in four groups of 12 STS-1 channels in the embodiment shown in FIG. 4. In an embodiment, any group of 12 of the 48 STS-1 channels may be cross-connected to 16 TDM/STS channels provided by the TDM interface over the stackplane between the channel banks. In a further embodiment, the 12 STS-1 channels in any one of the four groups from the STS cross-connect controller are connected to the TDM/STS channels of the TDM interface over the stackplane by bit assignments in a TSI source pointer provided by the TSI within the respective channel bank.

In the embodiments described above, the stackplane between adjacent channel banks provides an interbank link for timing, payload and communications. In an embodiment, the stackplane provides transparent TDM, STS and ATM duplex data link channels. In an embodiment, the stackplane is organized as a single physical layer transceiver that has two data links, namely, a TDM/STS data link and an ATM data link. In an embodiment, the TDM/STS data link consists of 16 time division multiplexed logical channels. In an embodiment, each of the logical channels in the TDM/STS data link is a 6.48 megabyte or 51.84 megabit channel. Each STS-1 channel is organized as 810 bytes per SONET frame which has a frame length of 125 μs. In an embodiment, the ATM data link is a single 103 megabit data link organized as a single 12960 byte, 125 μs frame that carries 216 ATM cells per frame.

Figure 5:
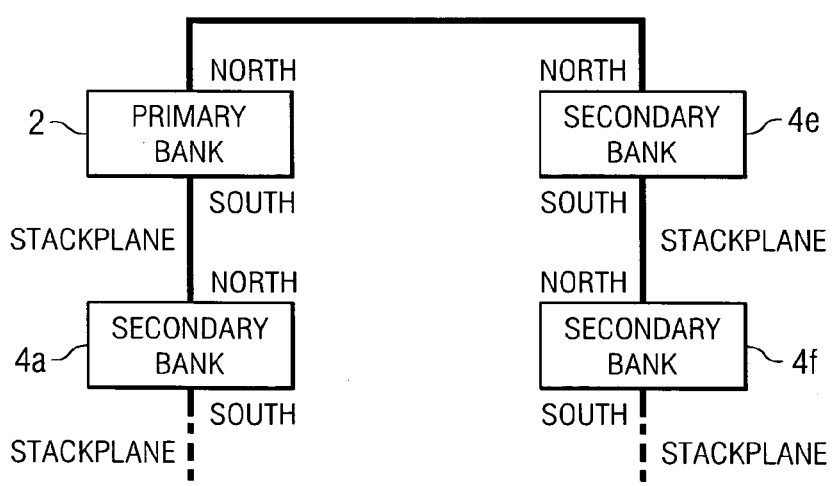
FIG. 5 shows a block diagram of an embodiment of the scalable digital loop carrier system according to the present invention in a daisy-chain configuration.

FIG. 5 shows a block diagram of an embodiment in which the channel banks are organized in a redundant daisy-chain configuration. In this embodiment, the timing and synchronization for the secondary channel banks 4a, . . 4e, 4f, . . . are provided by the primary channel bank 2. The stackplanes provide daisy-chains from the primary channel bank 2 in two directions, referred to as "north" and "south". The north of the secondary channel bank 4a is connected to the south of the primary channel bank 2. However, the north of the primary channel bank 2 is connected to the north of the secondary channel bank 4e in this arrangement. The north of the secondary channel bank 4f is connected to the south of the secondary channel bank 4e. The redundant daisy-chain configuration is simply a variation of the linear chain configuration shown in FIG. 1. Although linear-chain and daisy-chain configurations for interconnections between channel banks have been described above, other configurations may also be provided for interconnections between the channel banks within the scope of the present invention.

Figure 6:
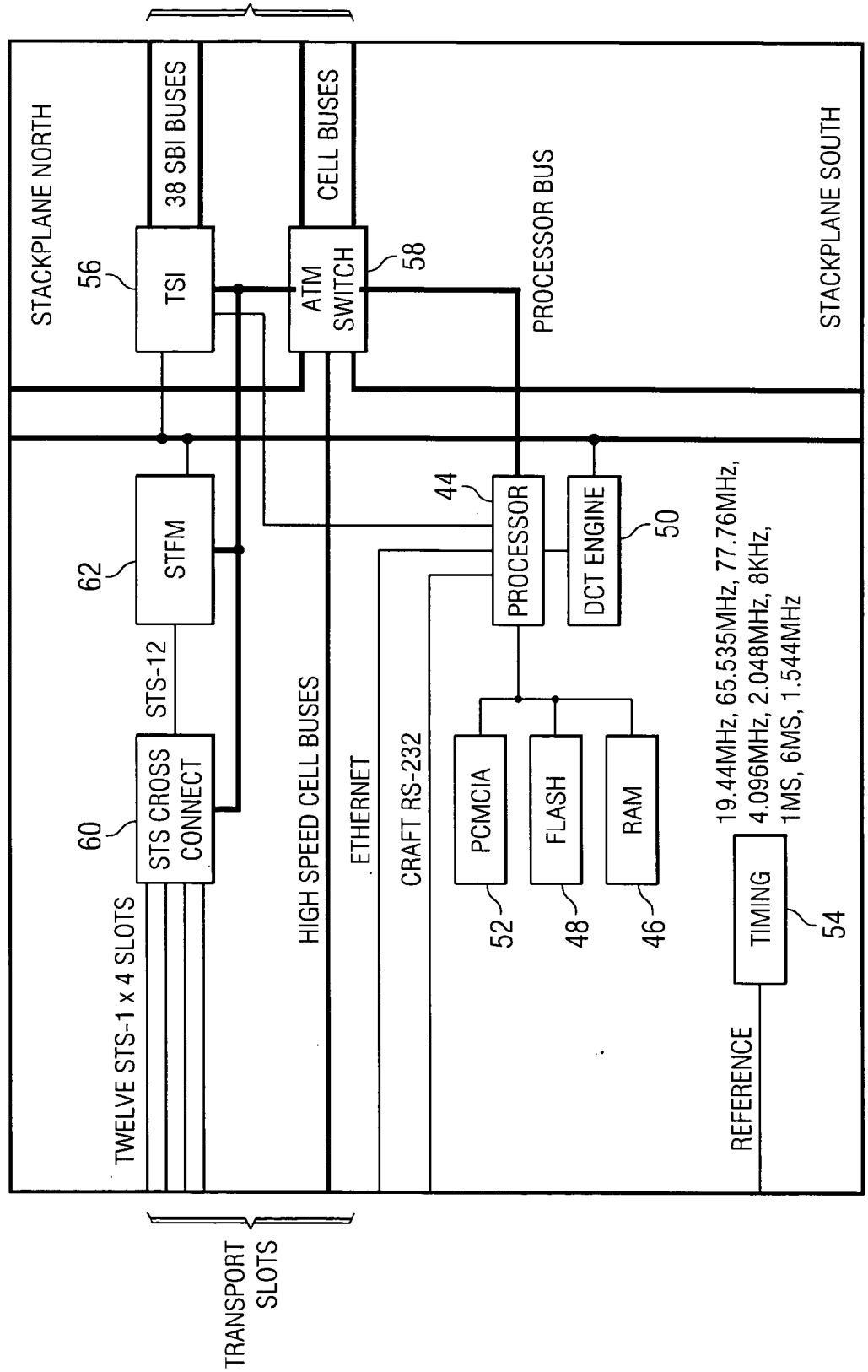
FIG. 6 shows a block diagram of an embodiment of a node control processor (NCP) for stackplane access control in the scalable digital loop carrier system according to the present invention.

FIG. 6 shows a block diagram of a node control processor (NCP) which incorporates TDM, STS and ATM transport functions and interbank transport control functions in each of the primary and secondary channel banks in the scalable digital loop carrier system according to the present invention. The NCP contains the basic electronics to support the channel bank in which the NCP is provided. In an embodiment, the NCP includes a microprocessor 44, a random access memory (RAM) 46, a flash memory 48, a data link and control tone card (DCT) 50 and one or more external interfaces such as an Ethernet interface or an RS-232 serial interface. In an embodiment, the NCP also includes a PCMCIA port 52 for optional peripheral equipment. A clock reference is provided to one or more timing generators 54 in the NCP to provide clock signals for various applications.

In an embodiment, the functions performed by the TSI 56, the ATM access controller or ATM switch 58, and the STS cross-connect controller 60 in the channel bank are integrated in the NCP. The ATM switch 58 has a plurality of ATM cell bus interfaces for transporting ATM cells while the STS cross-connect controller 60 has a plurality of STS transport card slots for transporting STS-1 signals to a plurality of STS transport cards. In an embodiment, the STS cross-connect controller 60 has four transport card slots each capable of supporting up to 12 STS-1 channels.

The TSI 56 is connected to both the ATM switch 58 and the STS cross-connect controller 60. The TSI 56 has a plurality of subscriber bus interfaces and is capable of cross-connecting any time slot on one of the subscriber bus interfaces to another time slot on another one of the subscriber bus interfaces. In an embodiment, the TSI 56 is capable of cross-connecting the time slots of variable rate subscriber bus interfaces, an embodiment of which is described in U.S. Pat. No. 6,621,830, previously incorporated by reference.

In an embodiment, the node control processor as shown in FIG. 6 further comprises a SONET framer 62 connected to the STS cross-connect controller 60. In an embodiment in which TDM traffic is carried over the SONET, the STS-1 signals are framed by a standard SONET frame which has a duration of 125 μs. The TSI 56 is connected to both the SONET framer 62 and the ATM switch 58 and is controlled by the microprocessor 44 to perform cross-connecting functions between the subscriber bus interfaces. The TSI 56 also controls the access of the SONET framer 62 to the stackplane with its source pointer memory. In an embodiment, the microprocessor 44 is connected to the TSI 56 through a processor bus in the NCP. The transport slots for the ATM switch 58 include high speed cell buses and the transport slots for the STS cross-connect controller 60 may be connected to a plurality of STS transport cards such as the STS transport cards 40a, 40b, 40c and 40d as shown in FIG. 4, each of which is capable of supporting up to 12 STS-1 channels.

Figure 7:
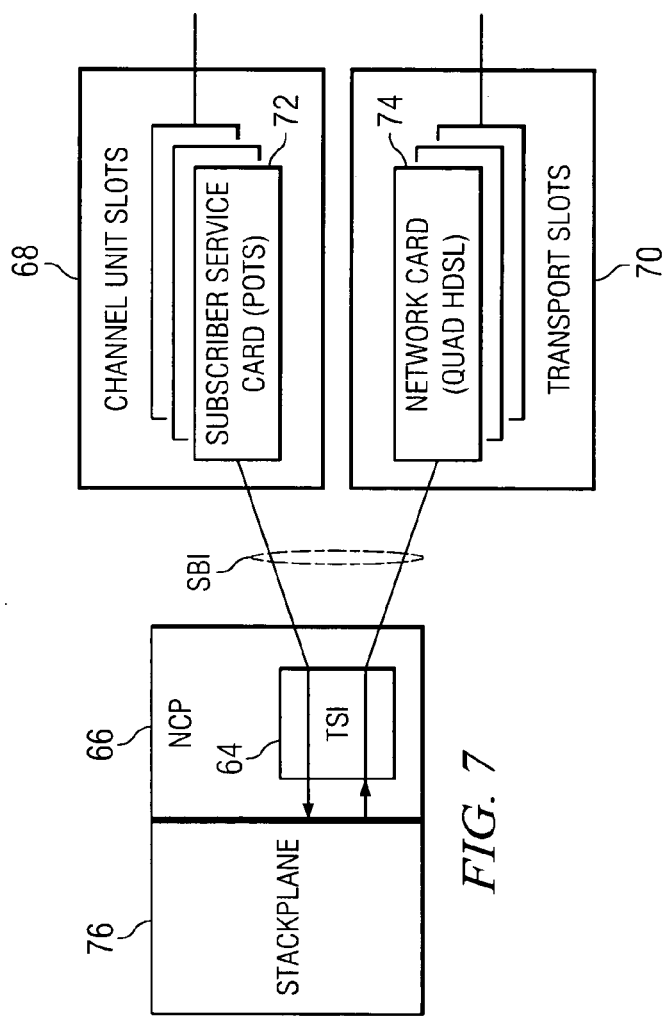
FIG. 7 shows a block diagram illustrating a copper wired time division multiplex (TDM) payload path in an embodiment of the scalable digital loop carrier system according to the present invention.

FIG. 7 shows a block diagram illustrating a TDM payload path for copper wire transport in an embodiment of the scalable digital loop carrier system according to the present invention. In this embodiment, the POTS signals are cross-connected to a network service interface by a time slot cross-connect interchanger (TSI) 64 in the NCP 66. The network service interface may be either a copper wire network interface or an optical fiber network interface. Typical copper wire network service interfaces include digital signal 1 (DS1) and high-speed digital subscriber line (HDSL) interfaces which are provided for channel unit slots 68. Typical optical fiber network service interfaces such as optical carrier 3 (OC-3) and OC-12 are provided in transport slots 70.

A plurality of subscriber service cards 72 for carrying POTS traffic may be connected to the channel unit slots 68 which communicate with the TSI 64 over a subscriber bus interface. A plurality of network cards 74 for carrying quadruple HDSL traffic may be plugged into the transport slots 70 which communicate with the TSI 64 over another subscriber bus interface. In an embodiment, subscriber bus interfaces connecting the channel unit slots 68 and the transport slots 70 to the TSI 64 are variable rate subscriber buses described in U.S. Pat. No. 6,621,830, previously incorporated by reference.

The TSI 64 communicates with the stackplane 76 which provides a physical layer data link for TDM traffic as well as ATM traffic between channel banks. In the direction from the subscriber bus interfaces to the stackplane, the TSI 64 performs a sequential read of all of the time slots and stores them sequentially in a memory. Each location in the memory of the TSI 64 represents a subscriber bus interface time slot. In an embodiment, two such memories are provided within the TSI 64, one of which is used for reading data from the subscriber bus interfaces and another one of which is used for writing the data to the stackplane 76. A source pointer is provided within the TSI 64 to address the memory for the time slots for writing operations to the stackplane. The TSI memory also includes one bit to indicate whether the data is to be written to the channel bank north of the stackplane and another bit to indicate whether the data is to be written to the channel bank south of the stackplane.

In the direction from the stackplane 76 to the channel unit slots 68 or to the transport slots 70, the data bytes from the stackplane 76 are read sequentially by the memory in the TSI 64 from the stackplane 76. The data bytes are stored sequentially in the TSI memory and read out of the memory by the subscriber bus interface using a memory source pointer. Sequential writing and random reading operations are performed in an embodiment to allow the data to be transferred from the stackplane 76 to the channel unit slots 68 and to the transport slots 70 in a broadcast mode.

Figure 8:
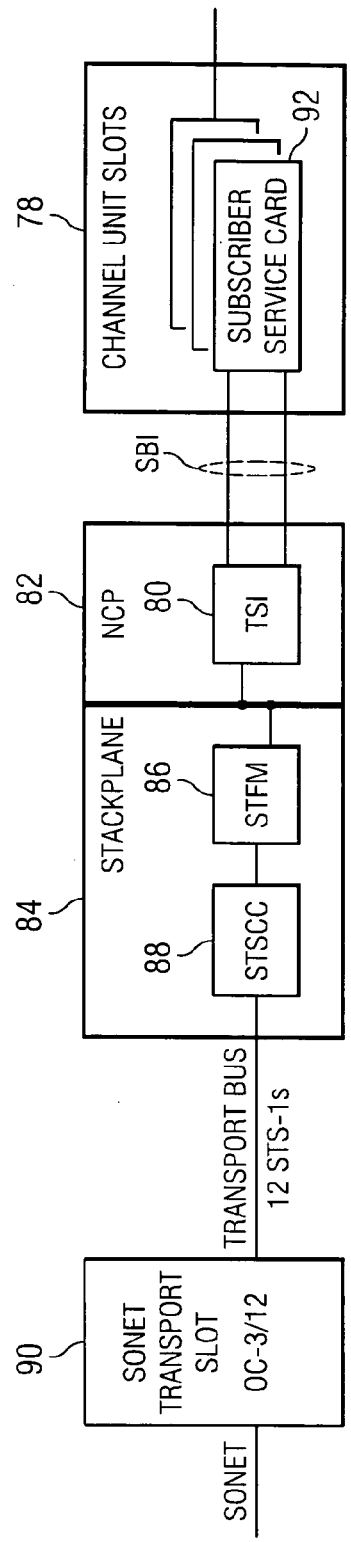
FIG. 8 shows a block diagram illustrating a synchronous optical network (SONET) TDM payload path in an embodiment of the scalable digital loop carrier system according to the present invention.

FIG. 8 shows a block diagram illustrating a SONET TDM payload path in an embodiment of the scalable digital loop carrier system according to the present invention. In a manner similar to TDM data transport using copper wires, the POTS DS0 traffic is transferred between channel unit slots 78 and a TSI 80 over a subscriber bus interface. The TSI 80, which is located in an NCP 82, combines a plurality of DS0 signals together to form a virtual tributary (VT) payload of 24 DS0 signals. In an embodiment, up to 28 such VT payloads can be placed into one of the 16 TDM channels on the stackplane 84. The VT payload, which is not in the VT format, is inserted into one of the 16 TDM channels on the stackplane by the TSI 80. In an embodiment, 28 VT payloads with a total of 672 DS0 signals are inserted into one of the stackplane TDM channels to form an STS-1.

TDM data received from the stackplane 84 are picked up by a SONET formatter 86, which converts the TDM payload into VT payloads and STS-1 signals. The STS-1 signals are cross-connected by a STS cross-connect controller 88, which passes the cross-connected STS-1 signals to a SONET transport card slot 90. A SONET network card may be plugged into the SONET transport card slot 90 to generate an OC-3 or OC-12 payload for SONET transportation. In an embodiment, a plurality of subscriber service cards 92 are plugged into the channel bank slots 78 for transferring DS0, DS1 or T1 signals over the subscriber bus interface, an embodiment of which is described in U.S. Pat. No. 6,621,830, previously incorporated by reference.

The stackplane architecture for the digital loop carrier system according to the present invention allows the system to be flexibly expanded with additional secondary channel banks as needed to increase the transport capacity of a communications node in a data network. Because both TDM and ATM interfaces are provided on the stackplane for linking the channel banks in the scalable digital loop carrier system, a variety of data formats including TDM, STS and ATM traffic are supported by the stackplane. The stackplane provides expanded bandwidth for different modes of native mode traffic types to allow the scalable digital loop carrier system according to the present invention to provide various types of communications including voice, video and data communications simultaneously.

The present invention has been described with respect to particular embodiments thereof, and numerous modifications can be made which are within the scope of the claims.

What is claimed is:

1. A scalable multi-service node for use in a communication network comprising a plurality of nodes, the multi-service node providing subscribers network access to voice, video, and data communications, the node comprising:
   a primary channel bank in communication with the communication network via a network interface and with a first set of subscribers via subscriber interfaces; and
   at least one secondary channel bank in communication with a second set of subscribers and coupled with the primary channel bank via at least a first interface for supporting a first traffic mode and a second interface for supporting a second traffic mode, wherein subscriber network access is via the network interface of the primary channel bank;
   the primary channel bank further including a controller providing timing control of the at least one secondary channel bank for providing synchronization of access traffic with the network; and
   the secondary channel bank further capable of coupling to at least one other secondary channel bank via interfaces for supporting the first traffic mode and the second traffic mode, wherein the at least one other secondary channel bank is in communication with a third set of subscribers in which timing control of access traffic is also provided by the controller of the primary channel bank.

2. The scalable multi-service node of claim 1, wherein the first interface and the second interface enable simultaneous transfer of the first traffic mode and the second traffic mode between channel banks for providing a subscriber with network access to voice, video, and data communications simultaneous over a single subscriber interface.

3. The scalable multi-service node of claim 1, wherein the primary channel bank includes a timing generator having a timing reference input for receiving a reference signal from the network and a corresponding clock synchronization output coupled to each secondary channel bank.

4. The scalable multi-service node of claim 3, wherein the timing reference input comprises a synchronous optical network (SONET) timing reference input.

5. The scalable multi-service node of claim 3, wherein each secondary channel bank includes a timing generator for providing timing reference for traffic corresponding to each respective secondary channel bank, each secondary channel bank timing generator is synchronized by a clock synchronization signal received from the clock synchronization output of the primary channel bank.

6. The scalable multi-service node of claim 1, wherein the primary channel bank is adapted for receiving coupling from additional secondary channel banks for enabling additional subscriber interfaces.

7. The scalable multi-service node of claim 1, wherein the first interface and the second interface enable simultaneous transfer of the first traffic mode and the second traffic mode between channel banks.

* * * * *